United States Patent
Blumenau et al.

(10) Patent No.: US 9,737,921 B2
(45) Date of Patent: Aug. 22, 2017

(54) DEVICE FOR STRIP GUIDANCE IN A HOT MEDIUM (II)

(71) Applicants: Cerobear GmbH, Herzogenrath (DE); Thyssenkrupp Steel Europe AG, Duisburg (DE)

(72) Inventors: Marc Blumenau, Hagen (DE); Frank Eisner, Chemnitz (DE); Christopher Gusek, Iserlohn (DE); Fred Jindra, Lennestadt (DE); Rudolf Schoenenberg, Daphne, AL (US); Bert-Reiner Willeke, Lennestadt (DE); Tobias Denner, Herzogenrath (DE); Christian Klatt, Aachen (DE); Jens Wemhoener, Aachen (DE)

(73) Assignee: Thyssenkrupp Steel Europe AG (DE)

( * ) Notice: Subject to any disclaimer, the term of this patent is extended or adjusted under 35 U.S.C. 154(b) by 177 days.

(21) Appl. No.: 13/261,972

(22) PCT Filed: Apr. 11, 2013

(86) PCT No.: PCT/DE2013/100134
§ 371 (c)(1),
(2) Date: Oct. 14, 2014

(87) PCT Pub. No.: WO2013/152763
PCT Pub. Date: Oct. 17, 2013

(65) Prior Publication Data
US 2015/0045195 A1 Feb. 12, 2015

(30) Foreign Application Priority Data
Apr. 12, 2012 (DE) .......... 10 2012 103 133

(51) Int. Cl.
*B21B 31/02* (2006.01)
*C23C 2/00* (2006.01)
(Continued)

(52) U.S. Cl.
CPC .............. *B21B 31/02* (2013.01); *C23C 2/003* (2013.01); *F16C 13/02* (2013.01); *F16C 21/00* (2013.01);
(Continued)

(58) Field of Classification Search
CPC ................ C23C 2/00; B21B 2031/023; B21B 2031/026; B21B 2031/028; B21B 31/16;
(Continued)

(56) References Cited

U.S. PATENT DOCUMENTS

| 5,571,327 A | 11/1996 | Ookouchi et al. |
| 5,954,880 A | 9/1999 | Aoki et al. |

(Continued)

FOREIGN PATENT DOCUMENTS

| DE | 4439660 A1 | 7/1995 |
| DE | 19608670 A1 | 9/1997 |

(Continued)

*Primary Examiner* — Jason L Vaughan
(74) *Attorney, Agent, or Firm* — David C. Purdue

(57) ABSTRACT

The invention relates to a device for strip guidance in a hot medium, comprising a deflection roller (3, 38) which has two roller pins (23, 39) and is mounted to supporting arms (1, 2, 34, 37, 54, 57) by means of ceramic journal bearings (20, 31), wherein the journal bearings (20, 31) are in each case arranged in a bearing receptacle (45, 55) of the associated supporting arm (1, 2, 34, 37, 54, 57). The invention is characterized in that at least one of the journal bearings (20, 31) in its associated supporting arm (1, 2, 34, 37, 54, 57) is fixed in the bearing receptacle (45, 55) by means of a force-fit that engages on the outer edge of the journal bearing (20, 31) and balances the different heat expansion coefficients of the journal bearings (20, 31) and the bearing receptacle (45, 55).

23 Claims, 5 Drawing Sheets

Figure 1:
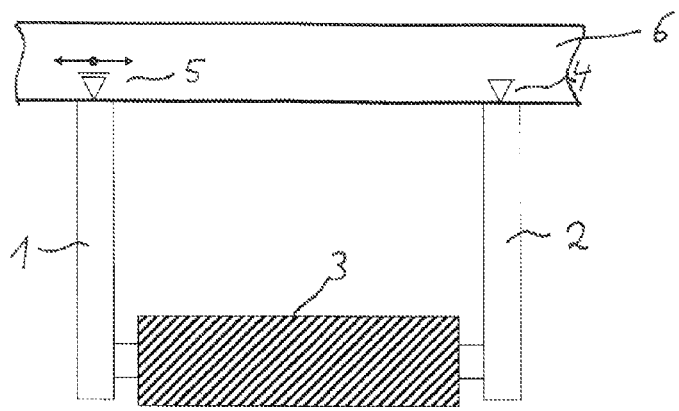

(51) Int. Cl.
  *F16C 13/02* (2006.01)
  *F16C 21/00* (2006.01)
  *F16C 17/02* (2006.01)
  *F16C 17/08* (2006.01)
  *F16C 19/26* (2006.01)

(52) U.S. Cl.
  CPC .............. *F16C 17/02* (2013.01); *F16C 17/08* (2013.01); *F16C 19/26* (2013.01)

(58) Field of Classification Search
  CPC .......... B21B 31/18; F16C 13/02; F16C 23/08; F16C 19/49; F16C 19/52; F16C 19/525; F16C 19/545; F16C 35/06; B05C 3/12; B05C 3/125; B05C 3/132
  USPC .................................................. 118/423, 419
  See application file for complete search history.

(56) References Cited

U.S. PATENT DOCUMENTS

| | | | |
|---|---|---|---|
| 7,175,711 B2 | 2/2007 | Platzer | |
| 7,476,033 B2 * | 1/2009 | Poloni | C23C 2/003 384/192 |
| 7,857,320 B1 * | 12/2010 | Chang | F16J 15/3456 277/389 |
| 8,047,718 B2 * | 11/2011 | Kim | C23C 2/00 118/400 |
| 8,500,336 B2 | 8/2013 | Kouscheschi et al. | |
| 2007/0003176 A1 | 1/2007 | Poloni et al. | |

FOREIGN PATENT DOCUMENTS

| | | |
|---|---|---|
| DE | 102004031709 A1 | 1/2006 |
| JP | S61241522 | 10/1986 |
| JP | S61241522 A | 10/1986 |
| JP | H0198156 A | 4/1989 |
| JP | H0356713 A | 3/1991 |
| JP | H0651264 A | 2/1994 |
| JP | H069004 Y2 | 3/1994 |
| JP | H0735147 A | 2/1995 |
| JP | H08170646 A | 7/1996 |
| JP | 2009013446 A | 1/2009 |
| WO | WO 9211398 A1 | 7/1992 |
| WO | WO 2006002822 A1 | 1/2006 |

* cited by examiner

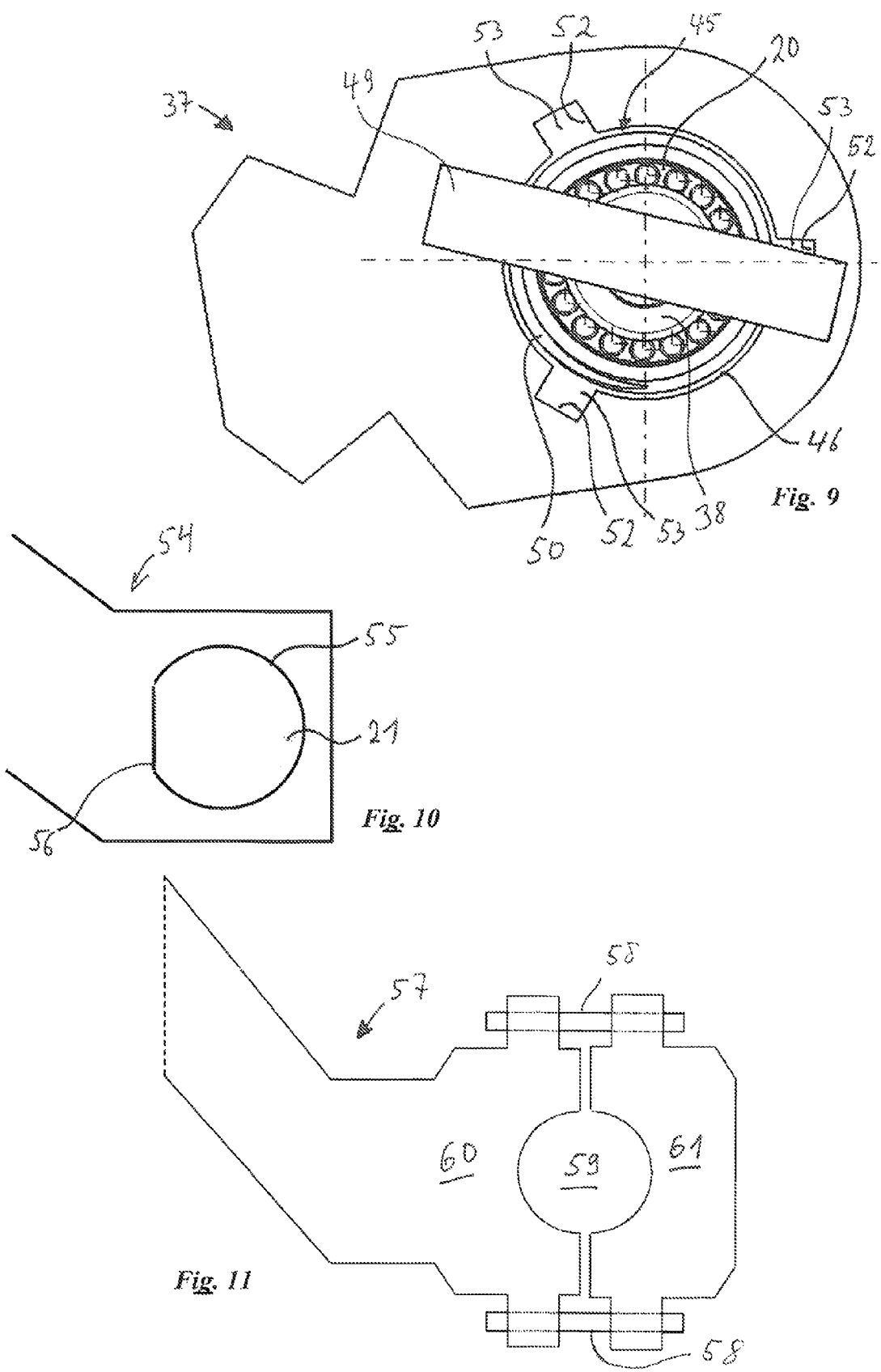

DEVICE FOR STRIP GUIDANCE IN A HOT MEDIUM (II)

The invention relates to a device for strip guidance in a hot medium having the features of the preamble of claim 1.

Devices of this type are used, for example, for the continuous hot-dip finishing of metal strips. The hot medium in this case is a coating bath of molten metal. A device of this type can also be used, however, for the hot treatment of a metal strip with steam or gas.

In hot-dip finishing, the metal strip is dipped into the coating bath, which is generally at a temperature of above 400° C., for several seconds. By way of example, a surface treatment of steel sheet with a corrosion-resistant coating based on a zinc alloy, aluminum alloy or zinc-aluminum alloy is used widely in industry. In this process, the strip to be coated is guided via one or more deflection rollers, which are dipped in the coating bath mounted on supporting arms. The supporting arms are held above the coating bath on a carrier device, for example a cross-member. Since parts of the supporting arm, the entire deflection roller and also the bearing point of the deflection rollers in the supporting arms dip into the coating bath, these elements are exposed to high thermal and mechanical stresses and also material attack by the aggressive molten bath. In this case, the bearing point of the deflection roller on the supporting arms experiences the greatest wear.

The wear can result in unsettled running of the strip and markings on the strip surface, and these can impair the surface quality of the treated metal strip considerably. In the worst case, a fracture can also arise in the region of the bearing point of the deflection roller, and this means not only a significant interruption in ongoing operation but also a hazard for the operating personnel. In order to avoid impairment of the surface quality produced or material failure, the device is replaced as soon as possible when there is evidence of a strong degree of wear, but this is inevitably associated with a system downtime of several hours. Replacement of the device is moreover costly.

EP 2159297 B1 discloses a device for strip guidance as per the preamble of claim 1. The carrier device for the supporting arms consists of two holding elements which are physically separated from one another and are fixed to the border of the bath. The journal bearings for bearing the deflection roller in the region of the roller journals are rolling bearings, which can have an entirely ceramic form. The roller journals provided with a protective coating can slide in the rolling bearings in the axial direction. A run-up plate is provided on the supporting arm and serves for bearing in the axial direction. A clearance is provided between the run-up plate and the end of the roller journal and can accommodate a temperature-induced change in length of the deflection roller.

This document does not address the problem of the different thermal expansion of the ceramic of the journal bearings as compared to the generally metallic material of the supporting arms. The higher coefficient of thermal expansion of the supporting arm material can lead to loosening of the respective journal bearing within the associated supporting arm. Loosening of this nature leads to undesired instabilities in the bearing of the deflection rollers, however, and this can contribute to unsettled running of the metal strip or to damage to the device.

EP 1518003 B1 likewise discloses a device for strip guidance of the type mentioned in the introduction, in which the deflection roller is mounted with roller journals in a plain bearing. The carrier device for the supporting arms consists of two holding elements which are physically separated from one another and each hold a supporting arm. It is disclosed to provide, for the plain bearing, a ceramic sleeve with sliding surfaces for the respective roller journal. The sleeve is fixed in the bearing housing of the supporting arm in a positive-locking manner by means of a fixing element and, when the sliding surfaces which are subjected to particularly high levels of stresses become worn, can be rotated about the longitudinal axis and fixed again in the bearing housing in a new orientation.

The supporting arms each have a wear-resistant run-up plate made of ceramic, against which the roller journal can run up in the axial direction in the case of a temperature-induced linear expansion. A clearance is provided between the ends of the roller journal and the respective run-up plate and can absorb a thermally induced change in length of the deflection roller without the supporting arms thereby being subjected to mechanical loading perpendicularly to the linear extent thereof. It is disadvantageous, however, that the clearance can permit an uncontrolled movement of the deflection roller, as long as the roller journals do not strike against the supporting arms. If, by contrast, the clearance between the roller journals and the stop on the supporting arms is too small, considerable mechanical loading can arise and the supporting arms may be bent up.

DE 196 08 670 A1 discloses a bearing system for a deflection roller in the molten metal bath, in which ball bearings are arranged in each case on the roller journals, the osculation of which ball bearings between the raceways of the race rings and the balls is greatly reduced. The bearings are therefore suitable predominantly for supporting the radial forces. It is disclosed to use race rings made of steel and balls of the bearing made of ceramic. Owing to the metallic race rings, problems are not to be expected in the fixing of the ball bearings in the supporting arms. A clearance is provided between the roller journals and run-up plates made of cemented carbide provided on the supporting arms to accommodate a linear expansion of the deflection roller. A ceramic ball is arranged in each case in the center of each roller journal. Owing to the clearance between roller journal and run-up plate, the problem addressed above in relation to the deflection roller possibly being unstably mounted in the axial direction or in relation to a high level of loading of the supporting arms by the expanding deflection roller is likewise present here.

WO 2006/002822 A1 discloses a device for strip guidance in which the deflection roller is mounted on a shaft fixed fixedly in terms of rotation on the supporting arms. This bearing system is encapsulated with respect to the molten bath, with gaps in the region of parts moving against one another being sealed off against the inlet of molten material by means of electrical induction. The supporting arms are fixed above the molten bath on a cross-member, with the possibility of being adjusted along the cross-member.

It is therefore an object of the invention to provide a device of the type mentioned in the introduction which makes it possible to achieve increased stability in the region of the ceramic bearing journals.

This object is achieved by the characterizing features of claim 1. Advantageous embodiments are indicated by the dependent claims.

Accordingly, it is proposed to fix at least one of the journal bearings in each case in the associated supporting arm in the bearing receptacle by means of a non-positive lock which engages on the outer edge of the journal bearing, the non-positive lock being designed in such a manner that different coefficients of thermal expansion of the journal bearings and of the bearing receptacle are compensated for.

In this way, the respective journal bearing is secured in the associated supporting arm against an undesirable movement relative to the supporting arm, e.g. tilting, twisting or release from the bearing receptacle. Since the journal bearing and the associated supporting arm are generally composed of different materials, the heating of the device according to the invention can lead to different thermal expansions of the bearing receptacle in the supporting arm on the one hand and of the journal bearings on the other hand, and therefore the journal bearing possibly sits too loosely in the bearing receptacle at least at relatively high temperatures. The journal bearing is ceramic, i.e. it consists entirely or at least predominantly of ceramic, whereas the associated supporting arm consists of another material, for example of metal.

The fixing by means of a non-positive lock can be improved compared to a case in which the journal bearing is secured merely in a positive locking manner, since the latter secures primarily against twisting and can therefore allow for play in the event of a different thermal expansion of journal bearing and bearing receptacle. By contrast, the non-positive lock can realize a precisely fitting retention of the journal bearing in the desired position.

The device according to the invention can be formed in such a way that at least one of the journal bearings is fixed by means of a clamping body which engages on the journal bearing and on the associated supporting arm and clamps the journal bearing against the associated supporting arm. The clamping body can act on the journal bearing and/or the supporting arm directly or indirectly, e.g. via intermediate bodies.

A clamping body of this type can have a higher coefficient of thermal expansion compared to the material of the supporting arm, and therefore the clamping action is also retained in the event of thermal expansion of the supporting arm. Suitable materials for the clamping body depend on the material of the supporting arm in the region of the bearing receptacle and also on the material of the journal bearing and are to be determined by a person skilled in the art. By way of example, a clamping body can consist of austenitic steel or high-grade steel. The variant in which the clamping body consists of austenitic steel can be used, for example, in the case of a supporting arm consisting of ferritic steel or high-grade steel, but is not limited thereto.

The clamping body can have a bar shape or an annular shape, for example.

Provision can also be made of a plurality of clamping bodies which act together and which all have higher coefficients of thermal expansion compared to the material of the supporting arm. Provision can also be made, however, of one or more clamping bodies, the coefficient of thermal expansion of which is the same as or lower than that of the material of the supporting arm, provided that one of the clamping bodies compensates for this in turn.

Instead of a higher coefficient of thermal expansion or in addition thereto, a clamping body, acting alone or together with (an) other clamping body (bodies), can have an alternative feature or a plurality of alternative features for bridging the different coefficients of expansion between the supporting arm and the journal bearing. A feature of this nature can be, for example, a wedge shape of the clamping body or of a part thereof. In the case of a widening bearing receptacle, the clamping action of a corresponding wedge piece can be retained by virtue of the fact that the wedge piece is pressed further into the bearing receptacle. The force required for the displacement of the wedge piece can be provided, for example, by a resilient element, which engages both on the supporting arm and also on the wedge piece. The magnitude of the spring force in this case is to be such that, during the cooling process, the wedge piece can slide in a direction counter to the spring force of the elastic spring element, in order to avoid crushing of the journal bearing. The wedge piece preferably has a thickness which decreases in the axial direction.

The wedge piece can also be composed of a plurality of wedge piece elements which are separated from one another. Wedge piece elements of this nature can be inserted, for example, in a manner distributed uniformly around the journal bearing.

The wedge piece can engage indirectly or directly on the supporting arm and on the journal bearing.

The wedge piece can be a component part of an annular clamping body or can be the annular clamping body itself. An annular wedge piece or an annular clamping body with a wedge piece can be inserted around the journal bearing between the latter and the bearing receptacle and can be self-centered in this arrangement.

As an alternative or in addition to one or more clamping bodies, at least one tie rod can be provided for securing against rotation. Here, the at least one tie rod can act between two separate supporting arm parts which form the bearing receptacle and can have a lower coefficient of thermal expansion than the material of the supporting arm. The distance between the supporting arm parts is determined by the tie rod or the tie rods. The coefficient of thermal expansion of the at least one tie rod can be the same as or similar to the coefficient of expansion of the journal bearing fixed thereby.

Furthermore, in addition to one or more clamping bodies and/or to at least one tie rod, the journal bearing can be secured by means of a positive lock, e.g. by a chamfer of the bearing receptacle acting on the journal bearing in a positive-locking manner.

As an additional measure to the non-positive lock, a positive lock can also be provided by extensions of the bearing outer ring engaging into grooves in the supporting arm.

The journal bearing can be a rolling bearing or else a plain bearing.

The device according to the invention can also be embodied in such a way that the bearing point of the deflection roller on the supporting arms is unencapsulated. This avoids the relatively high outlay in conjunction with protective means that encapsulate the journal bearing from the hot medium and also the relatively high space requirement. Moreover, encapsulation is costly and may also be a source for a further need for repair.

Like the deflection roller itself, the roller journal generally consists of metal. If use is made of a ceramic journal bearing and of roller journals made of a different material, e.g. metal, the different thermal expansion of the materials involved means that a bearing gap is to be provided in the radial direction between the journal bearing and the roller journal. This entails the risk that the hot medium, e.g. molten material, settles in the bearing gap, cools down when the device is removed from the hot medium, and solidifies, and therefore the external diameter of the roller journal is increased in the region of the journal bearing. In this way, the clearance between the journal bearing and the roller journal can be continuously reduced in the radial direction, until the clearance is no longer sufficient for the different coefficients of thermal expansion. The bearing may be destroyed. In order to counter this risk of an unencapsulated bearing, it may be advantageous to seal off the bearing gap against the penetration of the hot medium. In this respect, it may be advantageous to guide the journal bearing on the roller journal in a groove and to seal off the gap present in the axial direction between the lateral groove walls and the journal bearing against the penetration of the molten material.

This sealing-off operation can be effected, for example, by means of an elastic sealing disk which, for example, consists of graphite or comprises graphite.

The device according to the invention can also be embodied in such a way that roller stop elements for the roller journals are provided on the supporting arms.

Furthermore, the device according to the invention can be embodied in such a way that impact bodies, e.g. made of ceramic, are fixed releasably to the roller journals for an axially oriented impact against the supporting arms. The contact between impact body and associated supporting arm is preferably permanent during operation of the device according to the invention, and therefore the deflection roller is mounted stably in the axial direction between the supporting arms. In this respect, the releasable fixing of the impact bodies can be implemented at least also by means of one or more screwed connections.

The stability of the system as a whole can be increased by virtue of the fact that one of the supporting arms is mounted on the carrier device by means of a floating bearing, wherein the floating bearing allows the supporting arm mounted thereby on the carrier device to move parallel to the longitudinal direction of the deflection roller. Furthermore, provision is made of an elastic counterelement, which acts parallel to the longitudinal direction of the deflection roller, acts on the supporting arm mounted on the floating bearing and counteracts an increasing distance between the supporting arms. The counterbearing can in this case act indirectly or directly on the supporting arm.

The floating bearing enables a change in distance between the supporting arms in a direction parallel to the longitudinal axis of the deflection roller. With this solution, temperature-induced changes in length of the deflection roller do not lead to up bending of the supporting arms, but instead are absorbed by a change in distance between the supporting arms.

The elastic counterelement avoids an uncontrolled movement of the supporting arm mounted on the floating bearing. This is particularly advantageous when using a deflection roller which is mounted via roller journals on the supporting arms. The clearance in the axial direction between roller journals and supporting arms which is known in the prior art for absorbing thermal expansion of the deflection roller can be kept small or else can be avoided completely. In particular, provision can be made to allow the roller journals, at least during the heating phase and the insertion in the molten material, to rest permanently against stop plates arranged on the associated supporting arms. In the event of an increase in temperature, the thermal expansion of the deflection roller is absorbed by the floating bearing of the supporting arms on the carrier device. The elastic counterbody acting on the floating bearing ensures that the corresponding supporting arm can also rest permanently indirectly or directly axially on the roller journal of the deflection roller and axially supports the deflection roller, as a result of which an uncontrolled axial movement of the deflection roller between the supporting arms is prevented.

This is particularly advantageous for the transfer of the device from storage at room temperature to a preheating furnace, which heats the device up to a temperature close to that of the hot medium, e.g. of the molten bath. The floating bearing makes it possible for the distance between the supporting arms to concomitantly grow in accordance with the change in length of the deflection roller. The elastic counterbody in turn presses the supporting arms against the deflection roller and thereby keeps the device as a whole sufficiently stable at least for the transportation of the device and the dipping into the hot medium. Despite the large increase in temperature, the deflection roller can therefore be held without play in the axial direction between the supporting arms.

Provision can be made of a possibility to adjust the elastic counterelement in its position on the supporting arm in the direction of its longitudinal extent. The elastic force of the counterelement which acts on the supporting arm can therefore be varied. For assembly purposes, the elastic element can be removed from the supporting arm given appropriate adjustability.

The carrier device can be a cross-member. However, the invention can also comprise two holding elements which are physically separated from one another and each hold one of the supporting arms.

Furthermore, it can be advantageous to provide fixing means for fixing the supporting arm mounted via the floating bearing on the carrier device. Fixing of the supporting arm might be expedient in particular once the device has left the preheating furnace, i.e. immediately before dipping into the hot medium. Since the device, upon leaving the preheating furnace, has already been heated to close to the temperature of the hot medium, a significant linear expansion hereafter no longer arises. The fixing of the supporting arm no longer allows the deflection roller to perform any significant axial movement during dipping and during the coating operation, as a result of which it is possible to counter the particularly high levels of mechanical loading which are present during the dipping on account of the movement of the metal strip and to ensure settled running of the metal strip to be treated. While the supporting arm is fixed on the carrier device, the associated floating bearing and the elastic counterbody have no function. The supporting arm can also be fixed directly in the region of the floating bearing, which thereby becomes a locating bearing.

It can be advantageous to embody the device according to the invention in such a way that a supporting arm stop element adjustable in position is present for limiting the floating bearing movement. This does not provide complete fixing of the floating bearing, but rather merely a limitation for a movement which increases the distance between the supporting arms. Since the temperature of the hot medium is generally known from the outset, the position of the supporting arm stop element can already be suitably set before the heating operation in such a way that, when the maximum temperature is reached, the supporting arm mounted on the floating bearing butts indirectly or directly on the supporting arm stop element, such that the distance between the supporting arms cannot increase further.

The deflection roller, which for its part rests against the supporting arms, prevents a reduction of the distance. The system as a whole is therefore stable even after dipping into the hot medium.

The supporting arm stop element can also be positioned after the conclusion of the heating operation and before dipping into the hot medium.

The device according to the invention for strip guidance can also have more than one deflection roller on the same or on separate supporting arms, in which respect the features according to the invention can also be provided for the further deflection rollers. The further deflection rollers can serve, for example, as guide rollers for the strip to be treated. The further deflection rollers—if present—can likewise dip into the hot medium, e.g. into the coating bath, or in use can also remain without contact therewith.

Figure 2:
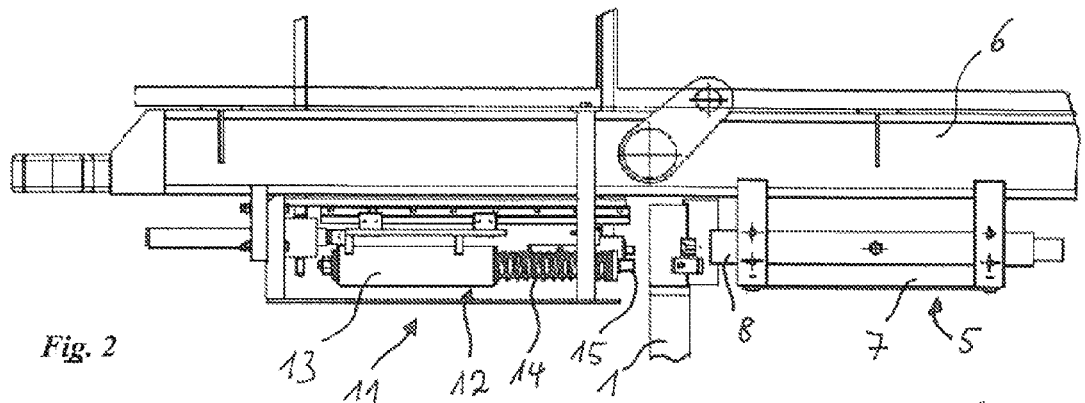
Figure 3:
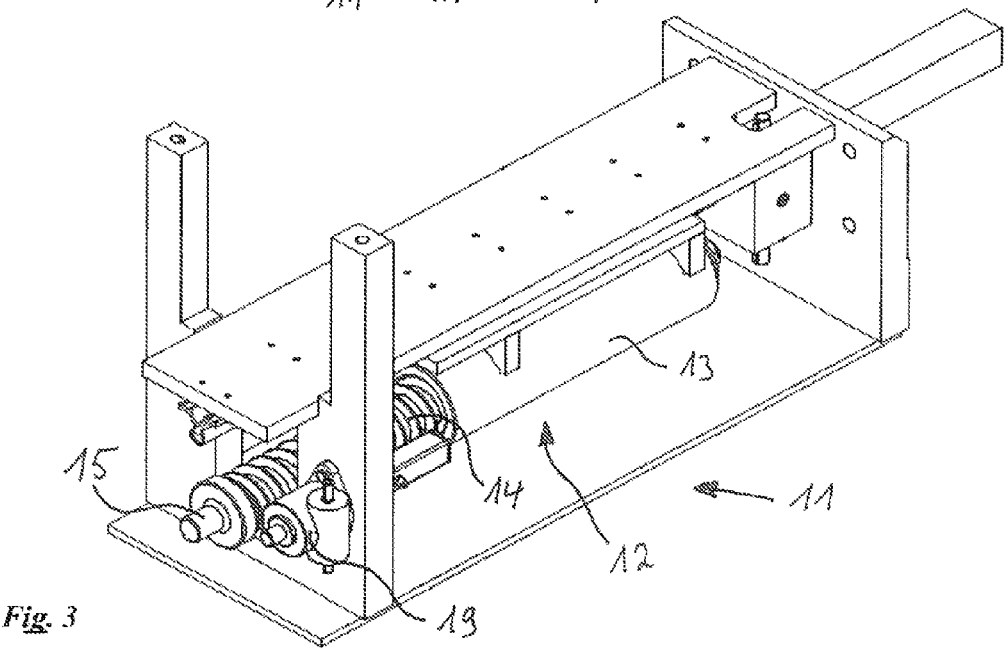
Figure 4:
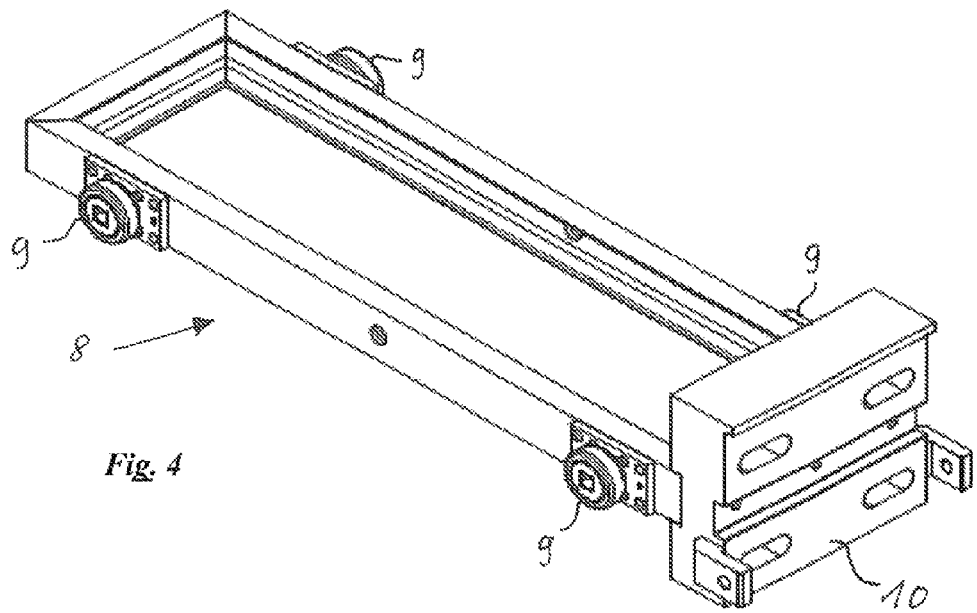
Figure 5:
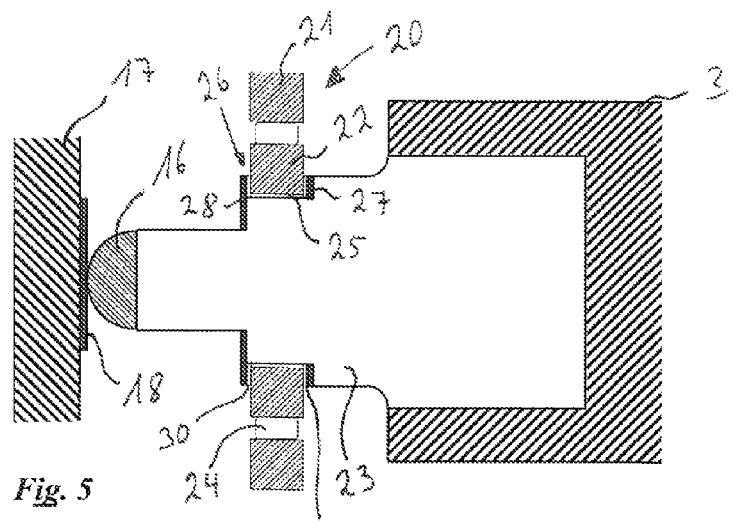
Figure 6:
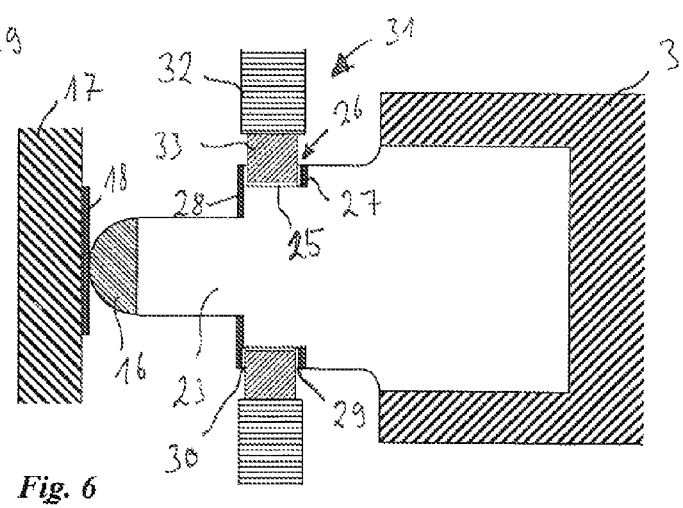
Figure 7:
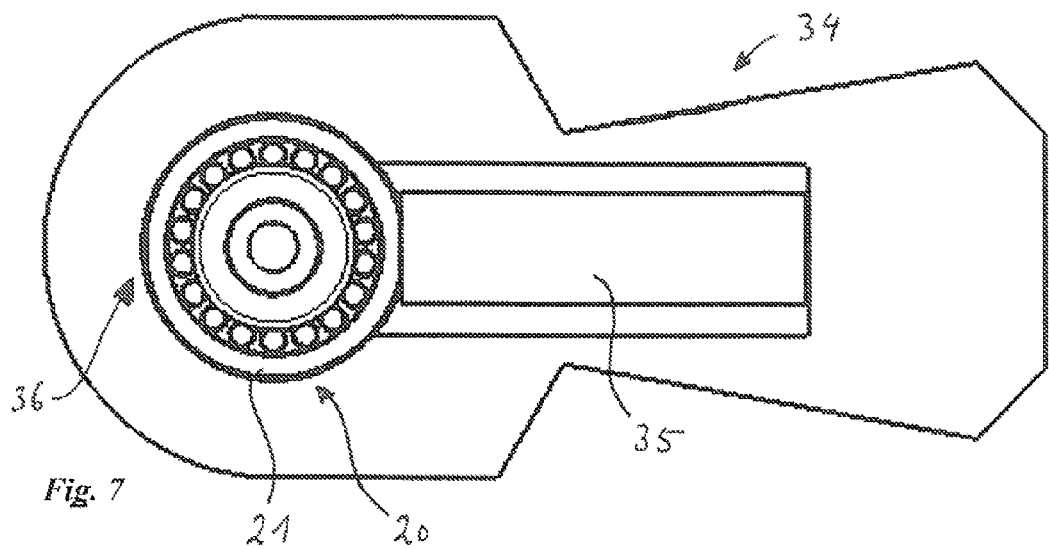
Figure 8:
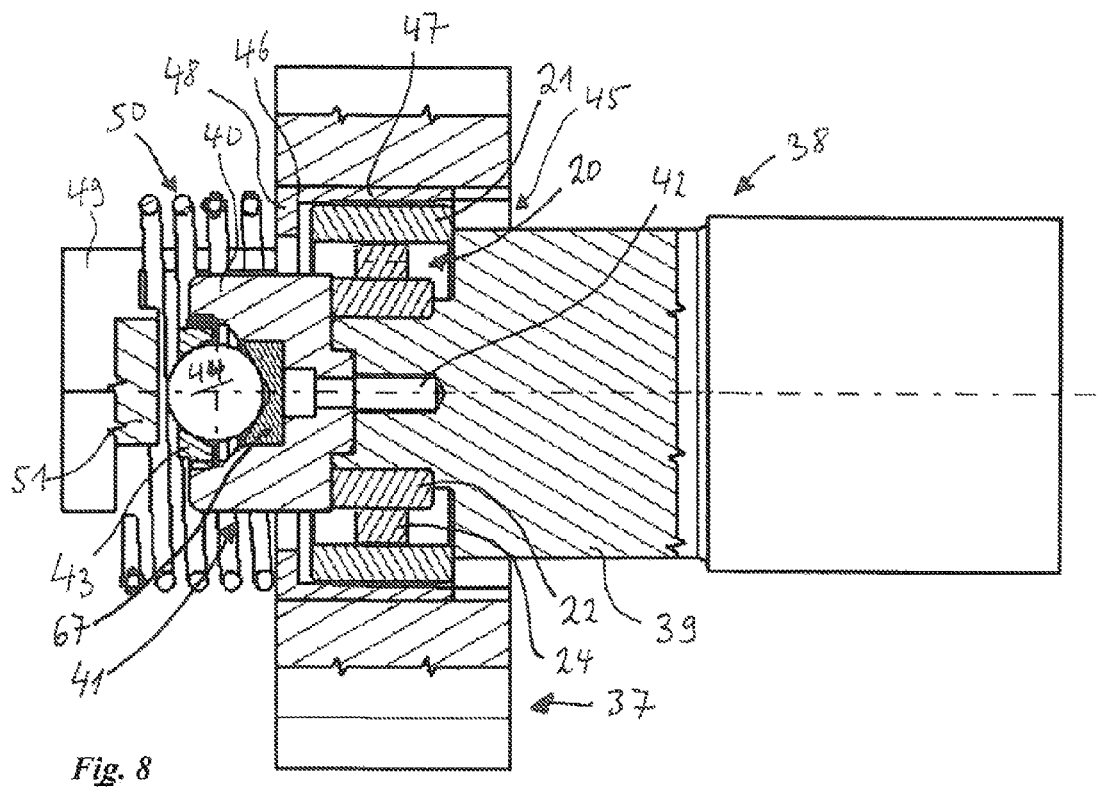
Figure 12:
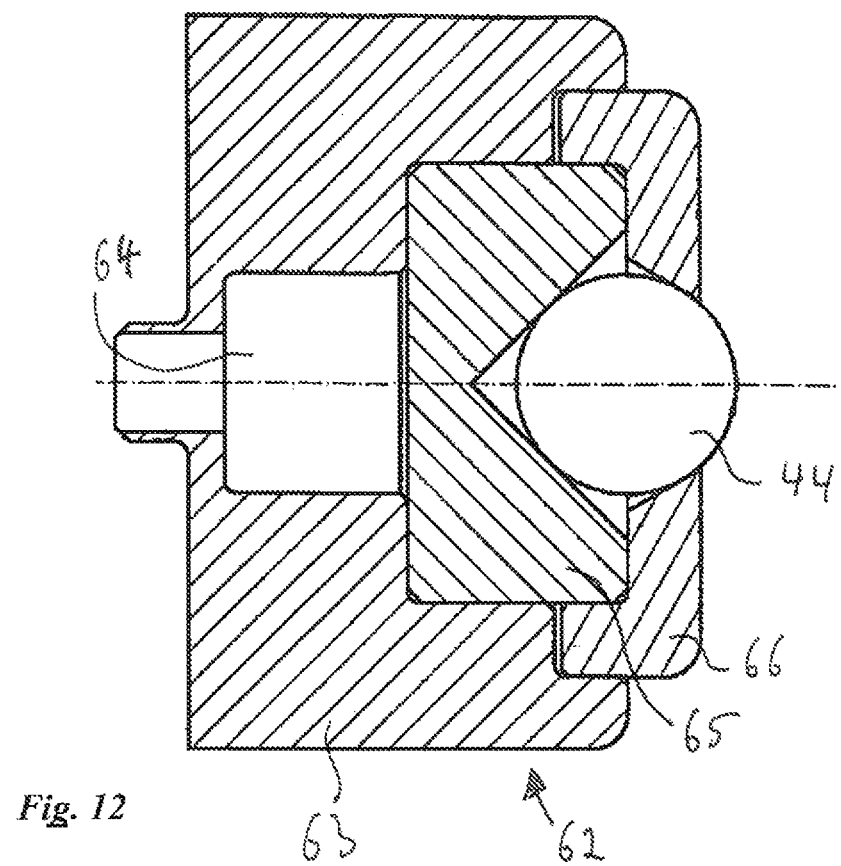

Exemplary embodiments of the invention will be explained hereinbelow on the basis of figures, in which, schematically:

FIG. 1: shows a deflection roller held via supporting arms on a cross-member,

FIG. 2: shows a portion of a cross-member with a floating bearing and a counterbody unit, FIG. 3: shows the counterbody unit as shown in FIG. 2 in a perspective view, FIG. 4: shows a displacement unit belonging to the floating bearing, FIG. 5: shows a roller journal on a deflection roller with a rolling bearing, FIG. 6: shows a roller journal on a deflection roller with a plain bearing, FIG. 7: shows part of a supporting arm with a bar element for rolling bearing clamping, FIG. 8: shows, in cross section, part of a supporting arm with a wedge ring for rolling bearing clamping, FIG. 9: shows rolling bearing clamping as shown in FIG. 8 in a plan view, FIG. 10: shows part of a supporting arm with a chamfer in a bearing receptacle, FIG. 11: shows part of a supporting arm with tie rods for rolling bearing clamping, and FIG. 12: shows a structure for assembling an impact body.

FIGS. 1 to 6 and 12 give an overview of the device as a whole, with a number of exemplary embodiments defined in the dependent claims being shown at the same time. Examples for fixing a journal bearing in a supporting arm by means of a non-positive lock will be explained in more detail with FIGS. 7 to 11.

FIG. 1 schematically shows a deflection roller 3 mounted rotatably on two supporting arms 1 and 2. The supporting arm 2 on the right is mounted on a cross-member 6 via a locating bearing 4 and the supporting arm 1 on the left is mounted on the cross-member 6 via a floating bearing 5.

FIG. 2 shows a certain portion of the cross-member 6 in an exemplary embodiment in the region of the floating bearing 5. The floating bearing 5 comprises a floating bearing housing 7, in which a displacement unit 8 is arranged such that it can be displaced parallel to the cross-member 6.

FIG. 4 shows a perspective view of the displacement unit 8, which is supported on rollers 9 in the floating bearing housing 7. The supporting arm 1 shown on the left in FIG. 1 is fixed to an arm mount 10.

A stabilization unit 11, which interacts with the floating bearing 5 via the supporting arm 1, is moreover provided on the cross-member 6. The stabilization unit 11 is shown on an enlarged scale in a perspective view in FIG. 3. The stabilization unit firstly comprises an elastic counterelement 12, which has a base unit 13, a spring unit 14 and also a supporting arm stop element 15. The elastic counterelement 13 is arranged such that it can be adjusted in the direction of its longitudinal extent within the stabilization unit 11. The adjustability can be provided, for example, by way of a spindle drive (not shown here). In the fully assembled state, the supporting arm stop element 15—unlike that shown in FIG. 2—rests against the supporting arm 1. The supporting arm stop element 15 can be displaced in a longitudinal direction counter to the force of the spring unit 14 in the direction of the base unit 13 of the elastic counterelement 12. The elastic counterelement 12, with the spring force of its spring unit 14, therefore counteracts a movement of the supporting arm 1 which increases the distance between the supporting arms 1 and 2, but at the same time allows for an increase in this distance between the supporting arms 1 and 2 on account of linear expansion of the deflection roller 3.

The elastic counterelement 12 therefore stabilizes the supporting arm 1 in its position in particular during the heating phase, in which the entire device is brought to temperatures close to the bath temperature to be expected. The deflection roller 3, which butts via an impact body 16 (see FIG. 5) merely against a stop plate 18 arranged on a securing bracket 17 of the supporting arm 3, is secured in the axial direction by the action of the elastic counterelement 12.

Once the heating process for the device as a whole has been concluded, it is also the case that no significant additional linear expansion of the deflection roller 3 is to be expected by virtue of the dipping into the molten bath. For this purpose, a limit stop element 19 is provided on the stabilization unit 11 and is engaged, for example via a further spindle drive element (not shown here), against the supporting arm 1 once heating has been concluded or is already moved into a suitable position beforehand, such that a further increase in the distance between the supporting arms 1 and 2 is prevented.

FIG. 5 shows an exemplary mounting of the deflection roller 3 with a rolling bearing 20, the outer ring 21 of which is fixed to the associated supporting arm 1, of which merely the securing bracket 17 is visible in FIG. 5. The mounting on the further supporting arm 2 (see FIG. 1) has a corresponding appearance. An inner ring 22 of the rolling bearing 20 surrounds a metallic roller journal 23 of the deflection roller 3. The outer ring 21, the inner ring and the rolling body 24 of the rolling bearing 20 are ceramic. On account of the considerably lower coefficient of expansion of the ceramic compared to the metal of the roller journal 23, a bearing gap 25 is provided in the radial direction between the roller journal 23 and the inner ring of the rolling bearing 22. When the deflection roller 3 has been dipped in, the roller journal 23 and the rolling bearing 20 are surrounded by hot molten metal. The inner ring 22 of the rolling bearing 20 is arranged in a circumferential groove 26, which is formed by limit disks 27 and 28. The limit disks 27 and 28 can be metallic or ceramic. A gap remains in each case between the limit disks 27 and 28 and the inner ring 22 and is filled with an elastic sealing disk 29 and 30 in order to prevent the admission of the molten metal to the bearing gap 25 and to thereby seal off the latter.

The, for example ceramic, impact body 16 is provided at the front end of the roller journal 23 and, in the present example, is hemispherical. The impact body 16 is in contact with the stop plate 18, which consists of a particularly wear-resistant metallic or ceramic material and is fixed to the securing bracket 17 of the supporting arm 1 (see FIG. 1).

The floating bearing 5, together with the elastic counterelement 12 (see FIG. 1), ensures that the supporting arm 1 rests by way of its stop plate 18 against the impact body 16. If there is then a temperature-induced expansion of the deflection roller 3, the impact body 16 presses via the stop plate 18 onto the supporting arm 1, which is thereby displaced to the left in FIG. 1. The floating bearing 5 permits this movement counter to the resistance of the elastic counterelement 12. Upon cooling, the elastic counterelement 12 ensures that the supporting arm 1 follows a contraction of the deflection roller 3. The deflection roller 3 is therefore fixed sufficiently between the supporting arms 1 and 2 in the axial direction in order to prevent undesirable axial movements of the deflection roller 3 between the supporting arms 1 and 2, for example during transportation of the device as a whole.

FIG. 6 shows an arrangement similar to that in FIG. 5, but with the rolling bearing 20 being replaced by a plain bearing 31. The plain bearing 31 consists of a plain bearing shell 32 and a plain bearing inner ring 33, at least the plain bearing inner ring 33 consisting of a ceramic.

For the rest, FIGS. 6 and 5 correspond to one another, and therefore reference is made to the description in relation to FIG. 5 owing to the further reference signs.

It is not shown in FIG. 5 how the rolling bearing 20 is held in the supporting arm 1 (see FIG. 1). The supporting arm 1 generally consists of metal, whereas the rolling bearing 20 is preferably produced entirely from, ceramic. Since, because of this, there are considerable differences in the coefficients of expansion of the rolling bearing 20 and the supporting arm 1, special provisions need to be made to fix the rolling bearing 20 in the supporting arm 1.

FIGS. 7 to 11, then, schematically show different variants of the rolling bearing fixing, in which the rolling bearing 3 is fixed either by a non-positive lock or by a positive lock. The variants of the rolling bearing fixing which are shown can also be used for devices for strip guidance which have a different configuration to the embodiments described in relation to FIGS. 1 to 6 and 12.

FIG. 7 schematically shows a first supporting arm variant 34, in which the rolling bearing 20 is fixed by means of a bar-shaped clamping element 35. The clamping element 35 has a higher coefficient of thermal expansion than the surrounding supporting arm material. The material of the clamping element 35 is thus to be selected in such a way that the clamping element 35 presses the rolling bearing outer ring 21 against the wall region 36, lying opposite the clamping element 35, of the bearing receptacle of the supporting arm 34 which receives the rolling bearing 20, without crushing the rolling bearing outer ring 21.

FIGS. 8 and 9 schematically show a second supporting arm variant 37, in which a deflection roller variant 38 is mounted via the rolling bearing 20. The lower block 40 of an impact body mount 41 is fastened to a roller journal 39 of the deflection roller variant 38 by means of a screw 42. In this case, the lower block 40 simultaneously serves as a lateral limit for the groove which receives the inner ring 22 of the rolling bearing 20. FIG. 8 does not depict the gaps shown in FIGS. 5 and 6 (radial bearing gap 25 and axial gaps filled with elastic sealing disks 29 and 30), but these are in actual fact also provided for the exemplary embodiment shown in FIG. 8.

The impact body mount 41 furthermore comprises an impact body receptacle 67 arranged in the lower block 40 and a fixing element 43, which can be screwed by way of an external thread into an internal thread of the lower block 40 in order to clamp a spherical impact body 44 against the impact body mount 41. The roller journal 39 and the rolling bearing 20 are accommodated in a bearing receptacle 45 of the second supporting arm variant 37. An annular wedge element 46 having a constant external radius is arranged between the bearing outer ring 21 and the wall of the bearing receptacle 45. The wedge element 46 comprises an axially running wedge piece 47 and a radially oriented end piece 48. With a constant external diameter, the internal diameter of the wedge piece 47 increases slightly from the end piece 48 toward the other, opposite end. The wedge piece 47 bridges the distance between the bearing outer ring 21 and the inner wall of the bearing receptacle 45 of the second supporting arm variant 37. If the distance between the wall of the bearing receptacle 45 and the bearing outer ring 21 grows on account of the greater thermal linear expansion of the second supporting arm variant 37, the wedge element 46 can slide in the axial direction, in order to maintain the clamping of the bearing outer ring 21 in the bearing receptacle 45.

A securing bracket 49 of the second supporting arm variant 37 spans a spring 50, which is tensioned between the securing bracket 49 and the end piece 48 of the wedge element 46, such that the spring 50 causes a moving up of the wedge element 46 as soon as the distance between the bearing outer ring 21 and the inner wall of the bearing receptacle 45 increases. The magnitude of the force acting on the wedge element 46 from the spring 50 has to be such that firstly the moving up described above is ensured, but secondly it is made possible for the wedge element 46 to slide back upon cooling of the second supporting arm variant, in order to prevent crushing of the rolling bearing 20 upon cooling of the device as a whole. A suitable shape of the wedge element 46 can be used to make it possible for the wedge element to slide back, e.g. with a wedge angle which is greater than the self-locking angle at the given boundary conditions.

If the second supporting arm variant 37 has been installed in the device as a whole, an elastic counterelement (for example the counterelement 12 shown in FIG. 2) will act on the second supporting arm variant 37, such that, when the device has been mounted completely, the impact body 44 rests against a stop plate 51 of the securing bracket 49. In this way, the deflection roller variant 38 is fixed sufficiently between the supporting arms. FIG. 8 shows, by contrast, a pre-assembly state, in which the impact body 44 is at a distance from the stop plate 51.

FIG. 9 shows a lateral plan view of the second supporting arm variant 37. The spring 50 can be seen beneath the securing bracket 49. The bearing receptacle 45 of the second supporting arm variant 37 has three grooves 52, which each receive correspondingly shaped extensions 53 of the wedge element 46. This prevents twisting of the wedge element in the bearing receptacle 45.

FIG. 10 shows, in a schematically fundamental illustration, a third supporting arm variant 54, which has a bearing receptacle 55 with a chamfer 56. The outer ring of the rolling bearing 20 (shown only schematically here) has a corresponding chamfer, which, in addition to clamping (not shown here), prevents spinning of the rolling bearing 20 in the third supporting arm variant 54.

FIG. 11 shows a fourth supporting arm variant 57, which provides for clamping of the rolling bearing (not shown here) by means of two tie rod bars 58. The tie rod bars 58 should have a coefficient of thermal expansion which matches to the greatest possible extent, ideally is identical to, that of the rolling bearing (not shown here). Therefore, the tie rod bars could consist, for example, of the same material, for example of ceramic, as the rolling bearing. Therefore, the thermally induced expansion of a rolling bearing receptacle 59 formed by two separate parts 60 and 61 of the fourth supporting arm variant 57 corresponds substantially to the thermal linear expansion of the rolling bearing itself, at any rate in the longitudinal direction of the tie rod bars 58.

FIG. 12, finally, shows in detail a variant of an impact body mount 62 with a spherical impact body 44. The lower block 63 has a receptacle 64 for a screw (not shown here), which can be used to fix the lower block to a roller journal of a deflection roller. An impact body receptacle 65 is fixed in the lower block 63, for example by a screwed connection (not shown here). A fixing element 66, which can be screwed into the lower block 63 by way of a threaded connection (not shown here), can be used to fix the impact body 44 on the impact body receptacle 65. The screwed connections permit simple reassembly of an impact body 44, which represents a wearing part.

LIST OF REFERENCE SIGNS

1 Supporting arm
2 Supporting arm
3 Deflection roller
4 Locating bearing
5 Floating bearing
6 Cross-member
7 Floating bearing housing
8 Displacement unit
9 Roller
10 Arm mount
11 Stabilization unit
12 Elastic counterelement
13 Base unit
14 Spring element
15 Supporting arm stop element
16 Impact body
17 Securing bracket
18 Stop plate
19 Limit stop element
20 Rolling bearing
21 Outer ring
22 Inner ring
23 Roller journal
24 Rolling body
25 Bearing gap
26 Groove
27 Limit disk
28 Limit disk
29 Elastic sealing disk
30 Elastic sealing disk
31 Plain bearing
32 Plain bearing shell
33 Plain bearing inner ring
34 First supporting arm variant
35 Clamping element
36 Wall region
37 Second supporting arm variant
38 Deflection roller variant
37 Roller journal
40 Lower block
41 Impact body mount
42 Screw
43 Fixing element
44 Impact body
45 Bearing receptacle
46 Annular wedge element
47 Wedge piece
48 End piece
49 Securing bracket
50 Spring
51 Stop plate
52 Groove
53 Extension of the wedge element
54 Third supporting arm variant
55 Bearing receptacle
56 Chamfer
57 Fourth supporting arm variant
58 Tie rod bars
59 Rolling bearing receptacle
60 Supporting arm part
61 Supporting arm part
62 Impact body mount
63 Lower block
64 Receptacle for screw
65 Impact body receptacle
66 Fixing element
67 Impact body receptacle

The invention claimed is:

1. A device for strip guidance in a hot medium, comprising a deflection roller (3, 38) which has two roller journals (23, 39) which are mounted by means of ceramic journal bearings (20, 31) on supporting arms (1, 2, 34, 37, 54, 57) each of which has a bearing receptacle (45, 55), the journal bearings (20, 31) being supported in the bearing receptacles (45, 55),
wherein at least one of the journal bearings (20, 31) is fixed in at least one of the bearing receptacles (45, 55) by means of a non-positive lock so that the at least one of the bearing receptacles (45, 55) frictionally engages an outer edge of the at least one of the journal bearings (20, 31) and compensates for different coefficients of thermal expansion of the at least one of the journal bearings (20, 31) and the at least one of the bearing receptacles (45, 55),
wherein at least one of the journal bearings (20, 31) is fixed to at least one of the supporting arms by means of a clamping body (35, 46) which engages on the at least one of the journal bearings (20, 31) and on the at least one of the supporting arms (1, 2, 34, 37, 54, 57) so that the at least one of the journal bearings (20, 31) is clamped against the at least one of the supporting arms (1, 2, 34, 37, 54, 57), and
wherein the clamping body (35, 46) has a higher coefficient of thermal expansion compared to the material of the at least one of the supporting arms (1, 2, 34, 37, 54, 57).

2. The device as claimed in claim 1, wherein the clamping body (35, 46) has a bar shape.

3. The device as claimed in claim 1, wherein at least one of the journal bearings (20, 31) is unencapsulated with respect to the hot medium,
wherein there is a bearing gap (25) between the at least one of the journal bearings (20, 31) and at least one of the roller journals (23, 39), and
wherein the bearing gap (25) is sealed off against the penetration of molten material.

4. The device as claimed in claim 3 wherein at least one elastic sealing disk (29, 30) is provided for sealing off the bearing gap (25) and the at least one elastic sealing disk is fixed against movement along an axis of the journal bearing: (20, 31).

5. The device as claimed in claim 4, wherein the at least one elastic sealing disk (29) comprises graphite or consists of graphite.

6. The device as claimed in claim 1, wherein one of the supporting arms (1, 2, 34, 37, 54, 57) is mounted on a carrier device by means of a floating bearing (5), wherein the floating bearing (5) allows the one of the supporting arms mounted thereby on the carrier device to move along a path parallel to an axis of the deflection roller (3, 38), and
wherein an elastic counterelement (12) acting in a direction parallel to the axis of the deflection roller (3, 38) on the supporting arm (1, 2, 34, 37, 54, 57) mounted on the floating bearing (5) is present and counteracts an increasing distance between the supporting arms (1, 2, 34, 37, 54, 57).

7. The device as claimed in claim 6, including fixing means for fixing the supporting arm (1, 2, 34, 37, 54, 57) mounted by means of the floating bearing (5) on the carrier device.

8. The device as claimed in claim 6, wherein a supporting arm stop element (15) adjustable in position is present for limiting the movement of the supporting arm (1, 2, 34, 37, 54, 57) mounted on the floating bearing (5).

9. A device for strip guidance in a hot medium, comprising a deflection roller (3, 38) which has two roller journals (23, 39) which are mounted by means of ceramic journal bearings (20; 31) on supporting arms (1, 2, 34, 37, 54, 57), each of which has a bearing receptacle (45, 55), the journal bearings (20, 31) being supported in the bearing receptacles (45, 55),
wherein at least one of the journal bearings (20, 31) is fixed in at least one of the bearing receptacles (45, 55) by means of a non-positive lock so that the at least one of the bearing receptacles (45, 55) frictionally engages an outer edge of the at least one of the journal bearings (20, 31) and compensates for different coefficients of thermal expansion of the at least one of the journal bearing (20, 31) and of the at least one of the bearing receptacles (45, 55),
wherein at least one of the journal bearings (20, 31) is fixed to at least one of the supporting arms by means of a clamping body (35, 46) which engages on the at least one of the journal bearings (20, 31) and on the at least one of the supporting arms (1, 2, 34, 37, 54, 57),
wherein the clamping body (35, 46) has an annular shape, and
wherein the annularly shaped clamping body (35, 46) comprises at least one wedge-shaped wedge piece (47).

10. The device as claimed in claim 9, including an elastic spring element (50) acting on the clamping body (35, 46) in the axial direction.

11. The device as claimed in claim 9, wherein at least one of the journal bearings (20, 31) is unencapsulated with respect to the hot medium,
wherein there is a bearing gap (25) between the at least one of the journal bearings (20, 31) and at least one of the roller journals (23, 39), and
wherein the bearing gap (25) is sealed off against the penetration of molten material.

12. The device as claimed in claim 11, wherein at least one elastic sealing disk (29, 30) is provided for sealing off the bearing gap (25) and the at least one elastic sealing disk is fixed against movement along an axis of the journal bearing (20, 31).

13. The device as claimed in claim 12, wherein the at least one elastic sealing disk (29) comprises graphite or consists of graphite.

14. The device as claimed in claim 9, wherein one of the supporting arms (1, 2, 34, 37, 54, 57) is mounted on a carrier device by means of a floating bearing (5), wherein the floating bearing (5) allows the supporting arm mounted thereby on the carrier device to move along a path parallel to an axis of the deflection roller (3, 38), and
wherein an elastic counterelement (12) acting in a direction parallel to the axis of the deflection roller (3, 38) on the supporting arm (1, 2, 34, 37, 54, 57) mounted on the floating bearing (5) is present and counteracts an increasing distance between the supporting arms (1, 2, 34, 37, 54, 57).

15. The device as claimed in claim 14, including fixing means for fixing the supporting arm (1, 2, 34, 37, 54, 57) mounted by means of the floating bearing (5) on the carrier device.

16. The device as claimed in claim 14, wherein a supporting arm stop element (15) adjustable in position is present for limiting the movement of the supporting arm (1, 2, 34, 37, 54, 57) mounted on the floating bearing (5).

17. A device for strip guidance in a hot medium, comprising a deflection roller (3,38) which has two roller journals (23, 39) which are mounted by means of ceramic journal bearings (20, 31) on supporting arms (1, 2, 34, 37, 54, 57), each of which has a bearing receptacle (45, 55), the journal bearings (20, 31) being supported in the bearing receptacles (45, 55),
wherein at least one of the journal bearings (20, 31) is fixed in at least one of the bearing receptacles by means of a non-positive lock so that the at least one of the bearing receptacles (45, 55) frictionally engages an outer edge of the at least one of the journal bearings (20, 31) and compensates for different coefficients of thermal expansion of the at least one of the journal bearings (20, 31) and the at least one of the bearing receptacles (45, 55),
wherein at least one of the journal bearings (20, 31) is secured in at least one of the bearing receptacles (45, 55) in at least one of the supporting arms by means of at least one tie rod (58),
wherein the at least one of the bearing receptacles (45, 55) is formed of two separate parts (60, 61) of the at least one of the supporting arms and the at least one tie rod holds the two separate parts (60, 61) in fixed relationship relative to each other, and
wherein the material of the at least one tie rod has a lower coefficient of thermal expansion than the material of the at least one of the supporting arms(1, 2, 34, 37, 54, 57).

18. The device as claimed in claim 17, wherein at least one of the journal bearings (20, 31) is unencapsulated with respect to the hot medium,
wherein there is a bearing gap (25) between the at least one of the journal bearings (20, 31) and at least one of the roller journals (23, 39), and
wherein the bearing gap (25) is sealed off against the penetration of molten material.

19. The device as claimed in claim 18, wherein at least one elastic sealing disk (29, 30) is provided for sealing off the bearing gap (25) and the at least one elastic sealing disk is fixed against movement along an axis of the journal bearing (20, 31).

20. The device as claimed in claim 19, wherein the at least one elastic sealing disk (29) comprises graphite or consists of graphite.

21. The device as claimed in claim 17, wherein one of the supporting arms (1, 2, 34, 37, 54, 57) is mounted on a carrier device by means of a floating bearing (5), wherein the floating bearing (5) allows the supporting arm mounted thereby on the carrier device to move in a direction parallel to an axis of the deflection roller (3, 38), and
wherein an elastic counterelement (12) acting in a direction parallel to the axis of the deflection roller (3, 38) on the supporting arm (1, 2, 34, 37, 54, 57) mounted on the floating bearing (5) is present and counteracts an increasing distance between the supporting arms (1, 2, 34, 37, 54, 57).

22. The device as claimed in claim 21, including fixing means for fixing the supporting arm (1, 2, 34, 37, 54, 57) mounted by means of the floating bearing (5) on the carrier device.

23. The device as claimed in claim 21, wherein a supporting arm stop element (15) adjustable iu position is present for limiting the movement of the supporting arm (1, 2, 34, 37, 54, 57) mounted on the floating bearing (5).

* * * * *